United States Patent
Schiavone et al.

(10) Patent No.: US 9,097,150 B2
(45) Date of Patent: Aug. 4, 2015

(54) METHOD OF ESTIMATING A VARIATION OF A QUANTITY OF SOOT ACCUMULATED IN A DIESEL PARTICULATE FILTER

(71) Applicant: GM GLOBAL TECHNOLOGY OPERATIONS LLC, Detroit, MI (US)

(72) Inventors: Giuseppe Schiavone, Bitonto (IT); Giacomo Latrofa, Turin (IT); Markus Hemm, Buettelborn (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/872,871

(22) Filed: Apr. 29, 2013

(65) Prior Publication Data

US 2013/0291520 A1    Nov. 7, 2013

(30) Foreign Application Priority Data

Apr. 30, 2012    (GB) .................................. 1207579.2

(51) Int. Cl.
| | |
|---|---|
| F01N 3/00 | (2006.01) |
| F02D 41/02 | (2006.01) |
| F01N 9/00 | (2006.01) |
| F01N 11/00 | (2006.01) |
| F02D 41/24 | (2006.01) |

(52) U.S. Cl.
CPC *F01N 3/00* (2013.01); *F01N 9/002* (2013.01); *F01N 11/002* (2013.01); *F02D 41/029* (2013.01); *F01N 2430/085* (2013.01); *F01N 2900/0421* (2013.01); *F02D 41/2422* (2013.01); *F02D 2200/0812* (2013.01); *Y02T 10/47* (2013.01)

(58) Field of Classification Search
USPC ........ 60/274, 276, 277, 295, 297, 311; 703/7, 703/8
See application file for complete search history.

(56) References Cited

U.S. PATENT DOCUMENTS

| | | | | |
|---|---|---|---|---|
| 6,622,480 | B2* | 9/2003 | Tashiro et al. ................. | 60/295 |
| 6,941,750 | B2* | 9/2005 | Boretto et al. ................. | 60/297 |
| 7,065,960 | B2* | 6/2006 | Gioannini et al. ............. | 60/295 |
| 8,051,645 | B2* | 11/2011 | Chamarthi et al. ............ | 60/295 |
| 8,161,737 | B2* | 4/2012 | Kanaya et al. ................. | 60/295 |
| 8,384,397 | B2* | 2/2013 | Bromberg et al. ............ | 324/636 |
| 8,577,541 | B2* | 11/2013 | Nevin et al. ................. | 701/29.4 |

FOREIGN PATENT DOCUMENTS

WO    2008133694 A1    11/2008

* cited by examiner

Primary Examiner — Binh Q Tran
(74) Attorney, Agent, or Firm — Ingrassia Fisher & Lorenz PC

(57) ABSTRACT

A method of estimating a variation of a quantity of soot accumulated in a diesel particulate filter coupled to an internal combustion engine is provided. The method includes a passive-regeneration check for checking whether a passive regeneration of the diesel particulate filter is occurring and, if this check yields that a passive regeneration is actually occurring, the method includes determining an initial quantity of soot that was accumulated in the diesel particulate filter when the passive regeneration began and determining a rough variation of the quantity of soot accumulated in the diesel particulate filter. An engine speed and an engine load are determined and, using the engine speed, the engine load, and the initial quantity of soot, a correction is determined. The variation of the quantity of soot accumulated in the diesel particulate filter is calculated as a function of the rough variation and the correction.

22 Claims, 5 Drawing Sheets

METHOD OF ESTIMATING A VARIATION OF A QUANTITY OF SOOT ACCUMULATED IN A DIESEL PARTICULATE FILTER

CROSS-REFERENCE TO RELATED APPLICATION

This application claims priority to British Patent Application No. 1207579.2, filed Apr. 30, 2012, which is incorporated herein by reference in its entirety.

TECHNICAL FIELD

The technical field relates to a method of estimating a variation of a quantity of soot accumulated in a diesel particulate filter coupled to an internal combustion engine, for example, an internal combustion engine of a motor vehicle.

BACKGROUND

It is known that an internal combustion engine generally comprises an engine block having at least a cylinder that accommodates a reciprocating piston coupled to rotate a crankshaft. A cylinder head closes the cylinder and cooperates with the piston to define a combustion chamber. An air and fuel mixture is inducted into the combustion chamber and ignited to produce hot expanding exhaust gasses that cause the movements of the piston.

The exhaust gasses exit the combustion chamber and are directed into an exhaust system, which includes an exhaust pipe coupled to the internal combustion engine and one or more exhaust aftertreatment devices configured to change the composition of the exhaust gasses flowing in the exhaust pipe. These aftertreatment devices generally include at least an oxidation catalyst (DOC) provided for oxidizing hydrocarbons and carbon monoxide into carbon dioxide and water, and a particulate filter (DPF), which is located downstream of the oxidation catalyst for trapping particulate matter or soot from the exhaust gasses.

More particularly, the particulate filter comprises a porous substrate structure that collects liquid and solid particles, while allowing the exhaust gasses to flow through. As a consequence, during the normal operation of the internal combustion engine, the quantity of soot accumulated inside the particulate filter progressively increases.

The quantity of soot accumulated inside the particulate filter, which is also conventionally referred as soot loading level, is constantly monitored by an electronic control unit (ECU).

More particularly, the ECU is generally configured to repeatedly measure a variation of the pressure drop across the diesel particulate filter, to apply the variation of the pressure drop to a mathematical model of the diesel particulate filter that yields an estimated variation of the soot loading level, and then to increase the soot loading level with the estimated variation.

As the soot loading level exceeds a predetermined threshold, which represents the nominal storage capacity of the diesel particulate filter, the ECU operates the internal combustion engine so as to promote an "active" regeneration of the diesel particulate filter, during which the accumulated soot is burned off and the original efficiency of the diesel particulate filter is restored.

More particularly, the ECU generally operates the internal combustion engine so as to increase the amount of hydrocarbons (HC, unburned diesel fuel) contained in the exhaust gasses. This increased amount of hydrocarbons is oxidized inside the diesel oxidation catalyst, thereby raising the temperature of the exhaust gasses flowing through the diesel particulate filter. In this way, the diesel particulate filter is heated up to a temperature (about 600-800° C.) which promotes a continuous oxidization of the accumulated soot.

However, the active regeneration is not the only regeneration process which the diesel particulate filter is subjected to. In fact, during the normal operation of the internal combustion engine, the diesel particulate filter may be subjected to a "passive" regeneration, also referred as CRT (Continuously Regenerating Trap), which causes part of the accumulated soot to be burned off.

A passive regeneration is a phenomenon that generally happens if the temperature of the exhaust gasses passing through the diesel particulate filter is comprised between 250° C. and 450° C., and the content of nitrogen oxides (NOx) at the inlet of the diesel particulate filter is large enough to promote the oxidation of the accumulated soot.

During a passive regeneration, the quantity of soot that actually oxidizes is generally smaller than the quantity of soot that, at the same time, is carried by the exhaust gasses and is trapped inside the diesel particulate filter, so that the net quantity of soot accumulated inside the diesel particulate filter is still increasing. Despite the increase of the accumulated soot quantity, the pressure drop across the diesel particulate filter during the passive regeneration generally decreases. The cause of this reduction of the pressure drop is that the passive regeneration oxidizes the soot which is trapped deeply in the porosity of the porous substrate structure of the diesel particulate filter, whereas the soot carried by the exhaust gasses is accumulated on the external surfaces.

The mathematical model used by the ECU to estimate the soot loading level in the diesel particulate filter generally correlates any reduction of the pressure drop to a correspondent reduction of the soot loading level. As a consequence, during a passive regeneration, this mathematical model may lead to a strong underestimation of the soot loading level inside the diesel particulate filter.

In order to solve this side effect, the ECU generally checks whether the diesel particulate filter is operating under the conditions for which a passive regeneration occurs, namely whether the temperature of the exhaust gasses is comprised in a predetermined range of values (typically 250-450° C.) and the nitrogen oxides content at the inlet of the diesel particulate filter exceeds an upper threshold. If these conditions are met, the ECU corrects the soot variation provided by the mathematical model with an additive correction.

At present, the additive correction is determined by means of three calibration maps, each of which is empirically determined for a different level of the environmental pressure and is designed to correlate the additive correction to the engine speed and the engine load. In use, the ECU measures the environmental pressure, the engine speed and the engine load, then uses the environmental pressure to select the proper calibration map, and the engine speed and the engine load to read in the selected calibration map the corresponding additive correction.

A drawback of this known strategy is that the estimation of the soot variation inside the diesel particulate filter during a passive regeneration phenomenon is still not sufficiently reliable, because of the too few parameters that are taken into account for determining the additive correction.

At least one object herein is that of solving the above mentioned drawback, in order to improve the estimation of the soot variation and consequently of the soot loading level in the diesel particulate filter.

At least another object is to attain this goal with a simple, rational and rather inexpensive solution. In addition, other objects, desirable features and characteristics will become apparent from the subsequent summary and detailed description, and the appended claims, taken in conjunction with the accompanying drawings and this background.

SUMMARY

In an exemplary embodiment, a method of estimating a variation of a quantity of soot accumulated in a diesel particulate filter coupled to an internal combustion engine is provided. The method comprises a passive-regeneration check for checking whether a passive regeneration of the diesel particulate filter is occurring and, if the check yields that a passive-regeneration is actually occurring, the method provides for performing the steps of:
  determining an initial quantity of soot that was accumulated in the diesel particulate filter when the passive regeneration began,
  determining a rough variation of the quantity of soot accumulated in the diesel particulate filter,
  determining an engine speed and an engine load,
  using the engine speed, the engine load and the initial quantity of soot to determine a correction, and
  calculating the variation of the quantity of soot accumulated in the diesel particulate filter as a function of the rough variation and the correction.

This estimating strategy is based on the discovery that, during a passive regeneration of the diesel particulate filter, the variation of the soot loading level depends not only on the engine speed and the engine load, but also on the initial quantity of soot that was already trapped in the diesel particulate filter when the passive regeneration began.

This contribution is taken into account by the proposed estimating strategy, thereby advantageously providing a more reliable estimation of the variation of the soot loading level during a passive regeneration.

The above named initial quantity of soot may be determined by considering that the variation of the accumulated soot quantity is continuously used to calculate the soot loading level in the diesel particulate filter.

Considering that, the initial quantity of soot may be determined by simply retrieving the soot loading level that was calculated when the passive-regeneration check yielded for the first time that the passive regeneration was occurring.

According to an embodiment, the correction may be determined by:
  using the engine speed and the engine load to determine a first correction factor,
  using the initial quantity of soot to determine e second correction factor,
  calculating the correction as a function of the first and the second correction factor.

In this regard, the correction can be determined with a minimum of computational effort.

According to another embodiment, the first correction factor may be determined by retrieving, from a first calibration map, a correction factor corresponding to the engine speed and the engine load.

In this regard, a prompt determination of the first correction factor is allowed.

According to another embodiment, the second correction factor is determined by retrieving, from a second calibration map, a correction factor corresponding to the initial quantity of soot that was accumulated in the diesel particulate filter when the passive regeneration began.

In this regard, a prompt determination of the second correction factor is allowed.

In this latter case, the retrieve of the second correction factor may be specifically performed by:
  calculating a difference between the initial quantity of soot and a predetermined reference value, and
  retrieving, from the second calibration map, a correction factor corresponding to this difference.

The fact of correlating the second correction factor to a difference between the soot accumulated quantity and a reference value simplifies the structure of the second calibration map.

According to an embodiment, the passive-regeneration check comprises the steps of:
  determining a content of nitrogen oxides in the exhaust gasses at the inlet of the diesel particulate filter,
  determining a temperature of the exhaust gasses at the inlet of the diesel particulate filter,
  determining a current quantity of soot accumulated in the diesel particulate filter,
  yielding that a passive regeneration is occurring, if the following conditions are met:
    the content of nitrogen oxides in the exhaust gasses exceeds a predetermined threshold value,
    the temperature of the exhaust gasses is within a predetermined range of values,
    the current quantity of soot accumulated in the diesel particulate filter exceeds a predetermined threshold value.

This embodiment is based on the discovery that the conditions that are conventionally verified to assess whether a passive regeneration is occurring are not always of the utmost reliability. More specifically, it has been discovered that the occurrence of a passive regeneration depends not only on the temperature and the nitrogen oxides content of the exhaust gasses, but also on the quantity of soot that is currently trapped in the diesel particulate filter. For this reason it may happen that, if the quantity of soot currently trapped in the diesel particulate filter is below a minimum level, the passive regeneration does not occur even if the conditions that concern the temperature and the nitrogen oxides content of the exhaust gasses are met.

This discovery is taken into account by the above disclosed embodiment, which provides an additional condition that is satisfied in order to assess whether a passive regeneration is actually on-going, thereby improving the estimation of the soot variation and consequently of the estimation of the soot loading level in the diesel particulate filter.

It should be observed that the above named current quantity of soot accumulated in the diesel particulate filter is the soot loading level calculated at the time that the passive-regeneration check is performed.

According to an embodiment, the threshold value of the quantity of soot accumulated in the diesel particulate filter is determined using several parameters, these parameters comprising the engine speed and the engine load.

This embodiment improves the efficiency of the strategy, since the engine speed and the engine load have been discovered to affect the minimum level of soot necessary for the passive regeneration to occur.

According to another embodiment, the above mentioned parameters comprise also the initial quantity of soot that was accumulated in the diesel particulate filter when the passive regeneration began.

This embodiment is based on the discovery that, once a passive regeneration of the diesel particulate filter has begun, the minimum level of soot necessary for the passive regeneration to continue depends not only on the engine speed and the engine load, but also on the initial quantity of soot that was accumulated in the diesel particulate filter when the passive regeneration began. In other words, it has been discovered that, for the same values of engine speed and engine load, the above mentioned minimum soot loading level varies on the basis of the quantity of soot that was trapped at the beginning of the passive regeneration.

As a consequence, the above disclosed embodiment provides a reliable criterion to assess whether the passive regeneration is still occurring or is already over, thereby further improving the estimation of the soot variation and consequently of the soot loading level in the diesel particulate filter.

According to an embodiment, the threshold value of the quantity of soot accumulated in the diesel particulate filter may be determined by:
  using the engine speed and the engine load to determine a rough threshold value,
  using an initial quantity of soot to determine a threshold-value correction, and
  multiplying the rough threshold value by the threshold-value correction.

In this regard, the threshold value of the accumulated soot quantity with a minimum of computational effort is attained.

According to another embodiment, the rough threshold value may be determined by retrieving, from a third calibration map, a threshold value corresponding to the engine speed and the engine load.

In this regard, a prompt determination the rough threshold value is allowed.

According to another embodiment, the threshold-value correction may be determined by retrieving, from a fourth calibration map, a threshold-value correction corresponding to the initial quantity of soot.

In this regard, a prompt determination the threshold-value correction is allowed.

The method according to an embodiment can be carried out with the help of a computer program comprising a program-code for carrying out all the steps of the method described above, and in the form of a computer program product on which the computer program is stored. The method can be also embodied as an electromagnetic signal, the signal being modulated to carry a sequence of data bits which represent a computer program to carry out all steps of the method.

Another embodiment provides an apparatus for estimating a variation of a quantity of soot accumulated in a diesel particulate filter coupled to an internal combustion engine, wherein the apparatus comprises passive-regeneration checking means for checking whether a passive regeneration of the diesel particulate filter is occurring, and means for estimating the variation of the quantity of soot accumulated in a diesel particulate filter, if the checking means yields that a passive-regeneration is actually occurring, the estimating means including:
  means for determining an initial quantity of soot that was accumulated in the diesel particulate filter when the passive regeneration began,
  means for determining a rough variation of the quantity of soot accumulated in the diesel particulate filter,
  means for determining an engine speed and an engine load,
  means for using the engine speed, the engine load and the initial quantity of soot to determine a correction, and
  means for calculating the variation of the quantity of soot accumulated in the diesel particulate filter as a function of the rough variation and the correction.

This embodiment achieves substantially the same advantages of the method disclosed above, in particular that of providing a more reliable estimation of the variation of the soot loading level during a passive regeneration.

According to an embodiment, the means for determining the correction may include:
  means for using the engine speed and the engine load to determine a first correction factor,
  means for using the initial quantity of soot to determine a second correction factor, and
  means for calculating the correction as a function of the first and the second correction factor.

In this regard, the correction can be determined with a minimum of computational effort.

According to another embodiment, the means for determining the first correction factor includes means for retrieving, from a first calibration map, a correction factor corresponding to the engine speed and the engine load.

In this regard, a prompt determination the first correction factor is allowed.

According to another embodiment, the means for determining the second correction factor includes means for retrieving, from a second calibration map, a correction factor corresponding to the initial quantity of soot that was accumulated in the diesel particulate filter when the passive regeneration began.

In this regard, a prompt determination the second correction factor is allowed.

In this latter case, the means for retrieving the second correction factor may specifically include:
  means for calculating a difference between the initial quantity of soot and a predetermined reference value, and
  means for retrieving, from the second calibration map, a correction factor corresponding to this difference.

The fact of correlating the second correction factor to a difference between the soot accumulated quantity and a reference value simplifies the structure of the second calibration map.

According to a different embodiment, the passive-regeneration checking means may comprise:
  means for determining a content of nitrogen oxides in the exhaust gasses at the inlet of the diesel particulate filter,
  means for determining a temperature of the exhaust gasses at the inlet of the diesel particulate filter,
  means for determining a current quantity of soot accumulated in the diesel particulate filter,
  means for yielding that a passive regeneration is occurring, if the following conditions are met:
  the content of nitrogen oxides in the exhaust gasses exceeds a predetermined threshold value,
  the temperature of the exhaust gasses is within a predetermined range of values,
  the current quantity of soot accumulated in the diesel particulate filter exceeds a predetermined threshold value.

This embodiment improves the reliability of the passive-regeneration check, thereby improving also the estimation of the soot variation and consequently the estimation of the soot loading level in the diesel particulate filter.

According to an embodiment, the apparatus may include means for determining the threshold value of the quantity of soot accumulated in the diesel particulate filter on the basis of several parameters, these parameters comprising the engine speed and the engine load.

In this regard, the efficiency of the strategy is improved, since the engine speed and the engine load have been discovered to affect the minimum level of soot necessary for the passive regeneration to occur.

According to another embodiment, the above mentioned parameters may comprise also the initial quantity of soot that was accumulated in the diesel particulate filter when the passive regeneration began.

In this regard, a reliable criterion is provided to assess whether the passive regeneration is still occurring or is already over, thereby further improving the estimation of the soot variation and consequently of the soot loading level in the diesel particulate filter.

According to an embodiment, the means for determining the threshold value of the quantity of soot accumulated in the diesel particulate filter may include:
- means for using the engine speed and the engine load to determine a rough threshold value,
- means for using the initial quantity of soot to determine a threshold-value correction, and
- means for multiplying the rough threshold value by the threshold-value correction.

In this regard, the threshold value of the accumulated soot quantity is attained with a minimum of computational effort.

According to another embodiment, the means for determining the rough threshold value may include means for retrieving, from a third calibration map, a threshold value corresponding to the engine speed and the engine load.

In this regard, a prompt determination of the rough threshold value is allowed.

According to another embodiment, the means for determining the threshold-value correction may include means for retrieving, from a fourth calibration map, a threshold-value correction corresponding to the initial quantity of soot.

In this regard, a prompt determination of the threshold-value correction is allowed.

Another embodiment provides an internal combustion engine equipped with a diesel particulate filter and an electronic control unit, wherein the electronic control unit is configured to perform a passive-regeneration check for checking whether a passive regeneration of the diesel particulate filter is occurring and, if the check yields that a passive-regeneration is actually occurring, the electronic control unit is further configured to:
- determine an initial quantity of soot that was accumulated in the diesel particulate filter when the passive regeneration began,
- determine a rough variation of the quantity of soot accumulated in the diesel particulate filter,
- determine an engine speed and an engine load,
- use the engine speed, the engine load and the initial quantity of soot to determine a correction, and
- calculate the variation of the quantity of soot accumulated in the diesel particulate filter as a function of the rough variation and the correction.

This embodiment achieves substantially the same advantages of the method disclosed above, in particular that of providing a more reliable estimation of the variation of the soot loading level during a passive regeneration.

According to an embodiment, the electronic control unit is configured to determine the correction by:
- using the engine speed and the engine load to determine a first correction factor,
- using the initial quantity of soot to determine a second correction factor,
- calculating the correction as a function of the first and the second correction factor.

In this regard, the correction is determined with a minimum of computational effort.

According to another embodiment, the electronic control unit may be configured to determine the first correction factor by retrieving, from a first calibration map, a correction factor corresponding to the engine speed and the engine load.

In this regard, a prompt determination of the first correction factor is allowed.

According to another embodiment, the electronic control unit is configured to determine the second correction factor by retrieving, from a second calibration map, a correction factor corresponding to the initial quantity of soot that was accumulated in the diesel particulate filter when the passive regeneration began.

In this regard, a prompt determination of the second correction factor is allowed.

In this latter case, the electronic control unit may be configured to retrieve the second correction factor by:
- calculating a difference between the initial quantity of soot and a predetermined reference value, and
- retrieving, from the second calibration map, a correction factor corresponding to this difference.

The fact of correlating the second correction factor to a difference between the soot accumulated quantity and a reference value simplifies the structure of the second calibration map.

According to an embodiment, the electronic control unit performs the passive-regeneration check by:
- determining a content of nitrogen oxides in the exhaust gasses at the inlet of the diesel particulate filter,
- determining a temperature of the exhaust gasses at the inlet of the diesel particulate filter,
- determining a current quantity of soot accumulated in the diesel particulate filter,
- yielding that a passive regeneration is occurring, if the following conditions are met:
- the content of nitrogen oxides in the exhaust gasses exceeds a predetermined threshold value,
- the temperature of the exhaust gasses is within a predetermined range of values,
- the current quantity of soot accumulated in the diesel particulate filter exceeds a predetermined threshold value.

In this regard, the reliability of the passive-regeneration check is improved, thereby improving also the estimation of the soot variation and consequently the estimation of the soot loading level in the diesel particulate filter.

According to an embodiment, the electronic control unit is configured to determine the threshold value of the quantity of soot accumulated in the diesel particulate filter using several parameters, these parameters comprising the engine speed and the engine load.

In this regard, the efficiency of the strategy is improved, since the engine speed and the engine load have been discovered to affect the minimum level of soot necessary for the passive regeneration to occur.

According to another embodiment, the above mentioned parameters may comprise also the initial quantity of soot that was accumulated in the diesel particulate filter when the passive regeneration began.

In this regard, a reliable criterion is provided to assess whether the passive regeneration is still occurring or is already over, thereby further improving the estimation of the soot variation and consequently of the soot loading level in the diesel particulate filter.

According to an embodiment, the electronic control unit may be configured to determine the threshold value of the quantity of soot accumulated in the diesel particulate filter by:
- using the engine speed and the engine load to determine a rough threshold value,
- using initial quantity of soot to determine a threshold-value correction, and multiplying the rough threshold value by the threshold-value correction.

In this regard, the threshold value of the accumulated soot quantity is attained with a minimum of computational effort.

According to another embodiment, the electronic control unit may be configured to determine the rough threshold by retrieving, from a third calibration map, a threshold value corresponding to the engine speed and the engine load.

In this regard, a prompt determination of the rough threshold value is allowed.

According to another embodiment, the electronic control unit may be configured to determine the threshold-value correction by retrieving, from a fourth calibration map, a threshold-value correction corresponding to the initial quantity of soot.

In this regard, a prompt determination of the threshold-value correction is allowed.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
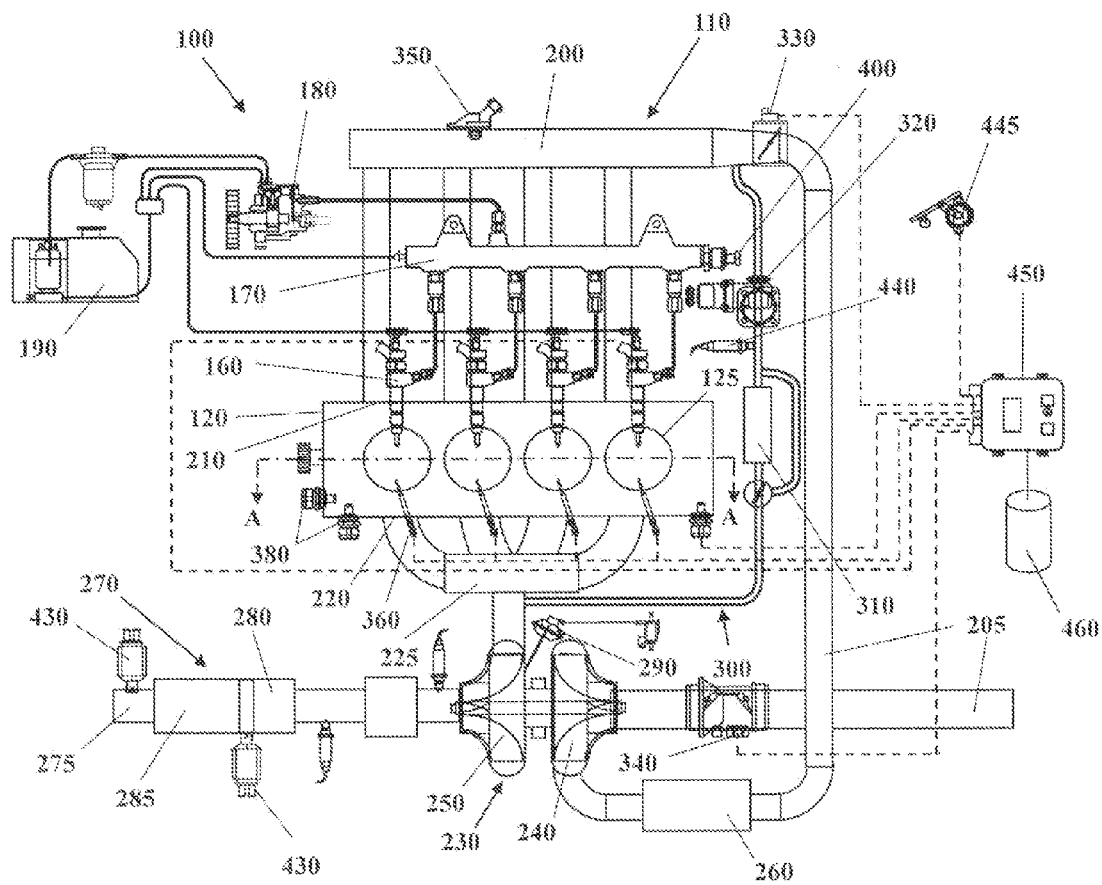
FIG. 1 is a schematic representation of an automotive system according to an embodiment.

Some embodiments may include an automotive system 100 as illustrated in FIG. 1, for example an automotive system of a motor vehicle.

Figure 2:
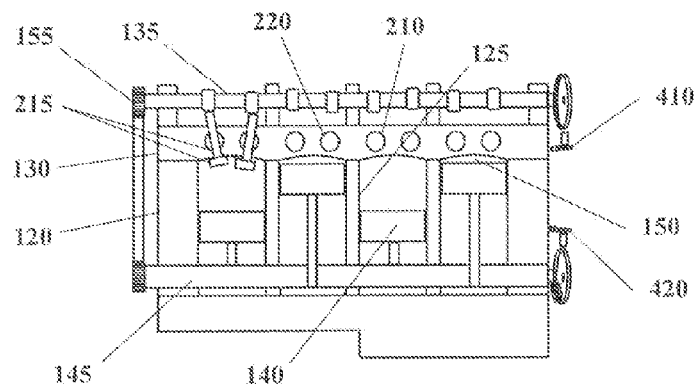
FIG. 2 is a cross-sectional view of the automotive system of FIG. 1 taken along line A-A.

As shown in FIGS. 1 and 2, the automotive system 100 includes an internal combustion engine (ICE) 110, in this example a Diesel engine, having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movements of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through at least one exhaust port 220. In some examples, a cam phaser 155 may selectively vary the timing between the camshaft 135 and the crankshaft 145.

The air may be distributed to the air intake port(s) 210 through an intake manifold 200. An air intake pipe 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the intake pipe 205 and manifold 200. An intercooler 260 disposed in the intake pipe 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust gases exit the turbine 250 and are directed into an exhaust system 270. The exhaust system 270 may include an exhaust pipe 275 having one or more exhaust aftertreatment devices. The aftertreatment devices may be any device configured to change the composition of the exhaust gases. More particularly, the aftertreatment devices may include an oxidation catalyst (DOC) 280 provided for oxidizing hydrocarbons and carbon monoxide into carbon dioxide and water, and a particulate filter (DPF) 285, which is located downstream of the oxidation catalyst 280 for trapping particulate matter or soot from the exhaust gasses. The exhaust system 270 may also include other aftertreatment devices, such as for example catalytic converters (two and three way), lean NOx traps (LNT), hydrocarbon adsorbers and selective catalytic reduction (SCR) systems.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a camshaft position sensor 410, a crankshaft position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, in an exemplary embodiment, this apparatus may include a digital central processing unit (CPU) in communication with a memory system 460 and an interface bus. The memory system 460 may include various storage types including optical storage, magnetic storage, solid state storage, and other non-volatile memory. The interface bus may be configured to send, receive, and modulate analog and/or digital signals to/from the various sensors and control devices. The CPU is configured to execute instructions stored as a program in the memory system 460, and send and receive signals to/from the interface bus. The program may embody the methods disclosed herein, allowing the CPU to carryout the steps of such methods and control the ICE 110.

One of the tasks performed by the ECU 450 is that of constantly monitoring the current value SLL of the quantity of soot accumulated in the DPF 285, hereinafter simply referred as soot loading level, in order to trigger an active regeneration of the DPF 285 as soon as the soot loading level exceeds a predetermined threshold value. This threshold value of the soot loading level may be a calibration value, which represents the nominal storage capacity of the DPF 285 and which may be determined during an experimental activity on a test bench and then stored in the memory system 460.

Figure 3:
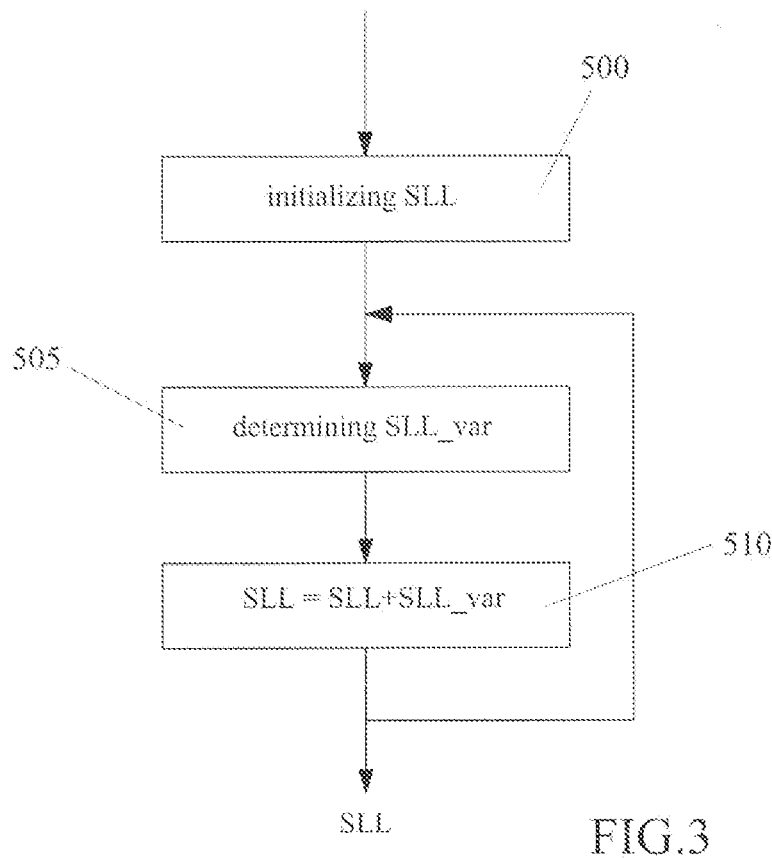
FIG. 3 is a flowchart of a method for determining the soot loading level in a diesel particulate filter of the automotive system of FIG. 1 according to an exemplary embodiment.

The current value SLL of the soot loading level may be constantly monitored with the strategy schematically shown in FIG. 3, according to an exemplary embodiment. This strategy provides for initializing to a predetermined residual value (block 500) the value SLL of the soot loading level, at the end of each active regeneration of the DPF 285. Then, the value SLL is progressively increased, during the normal operation of the ICE 110, by cyclically repeating the steps of determining a variation SLL_var of the soot loading level (block 505) and add this variation SLL_var to the last value SLL previously determined (block 510), thereby updating it. It should be observed that the variation SLL_var of the soot loading level may be a variation over the time (i.e. a change-rate), expressed for example in terms of grams of soot per second, and that the phase of adding the variation SLL_var to the last value SLL may be thus replaced by an integration of the variation SLL_var over the time.

Figure 4:
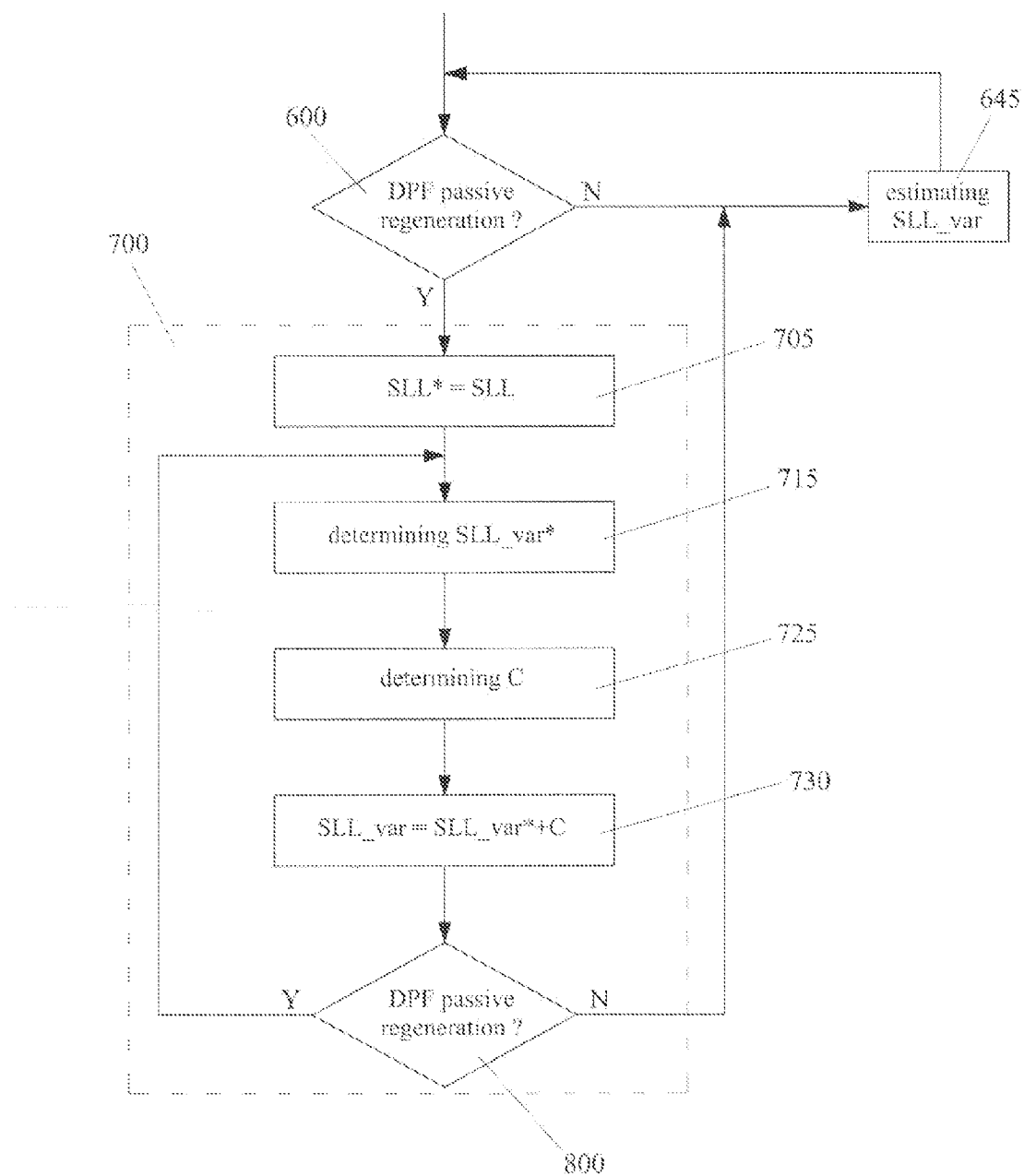
FIG. 4 is a flowchart of an estimating strategy involved in the method of FIG. 3.

In greater details, the variation SLL_var of the soot loading level may be determined with the estimating strategy schematically represented in the flowchart of FIG. 4 in accordance with an exemplary embodiment.

As a first step, the estimating strategy provides for checking whether a passive regeneration of the DPF 285 is occurring (check block 600). As long as the DPF 285 is not under a passive regeneration, the ECU 450 estimates (block 645) the variation SLL_var in an almost conventional way. When a passive regeneration of the DPF 285 begins, the ECU 450 estimates the variation SLL_var using a strategy which will be explained in more detailed thereafter.

Figure 5:
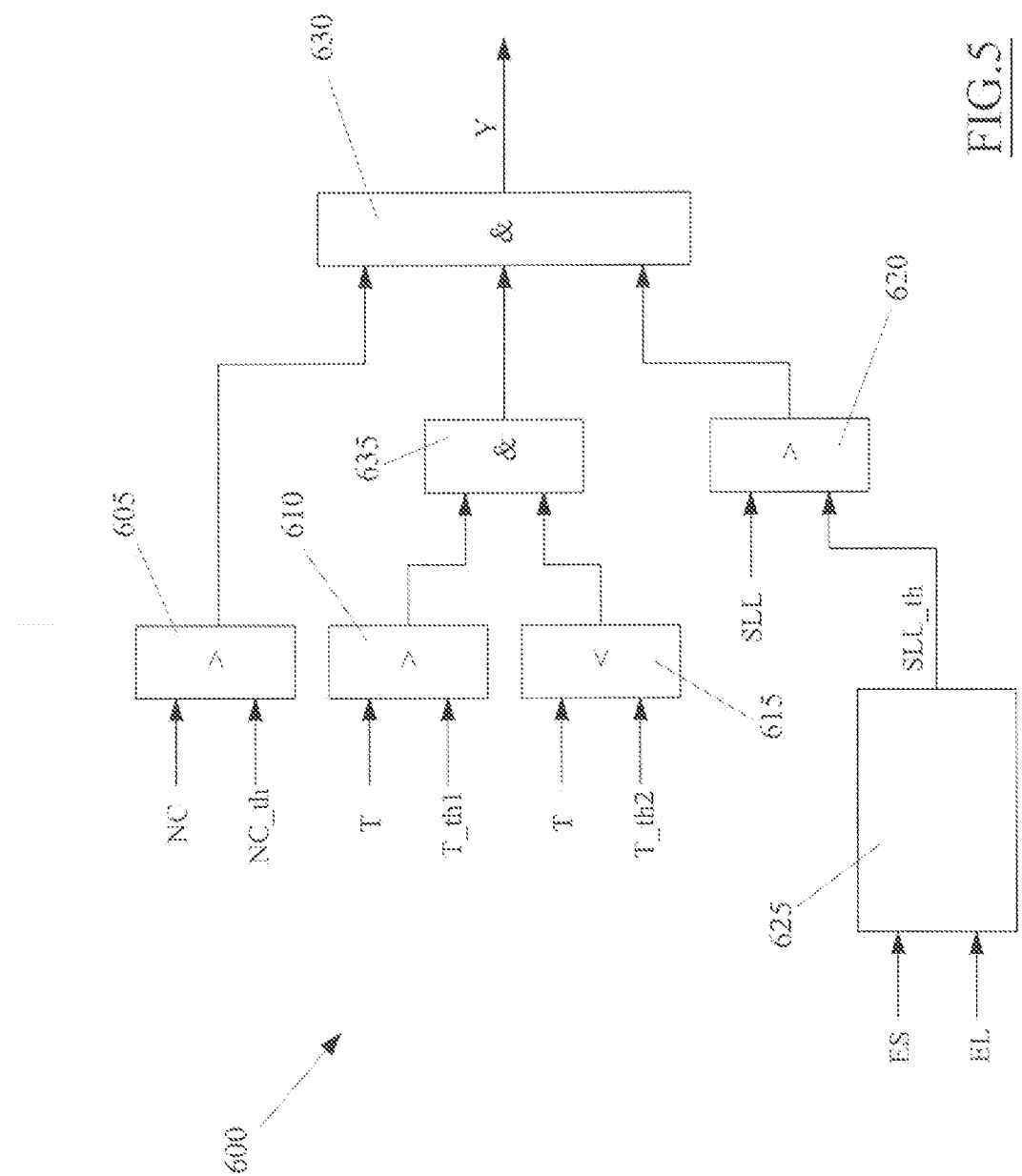
FIG. 5 is a flowchart representing a first check procedure involved in the strategy of FIG. 4.

The check block 600 may implement the procedure shown in FIG. 5. According to an embodiment, this procedure provides for determining the current value NC of the nitrogen oxides content of the exhaust gasses at the inlet of the DPF 285, the current value T of the temperature of the exhaust gasses at the inlet of the DPF 285, and the current value SLL of the soot loading level within the DPF 285. The value NC of the nitrogen oxides content may be measured with the aid of suitable sensors located in the exhaust system 270, or estimated with suitable estimating model. The value T of the exhaust gas temperature may be measured with the sensor 430 located at the inlet of the DPF 285. The current value SLL of the soot loading level is the last (most updated) value SLL calculated by the routine of FIG. 3 at the time that the check block 600 is performed.

The value NC of the nitrogen oxides content is compared (block 605) with a predetermined threshold value NC_th thereof. This threshold value NC_th may be a calibration value, which may be determined during an experimental activity on a test bench and then stored in the memory system 460.

The value T of the exhaust gas temperature is compared with a first predetermined threshold value T_th1 thereof (block 610) and with a second predetermined threshold value T_th2 thereof (block 615), wherein the second threshold value T_th2 is greater than the first one T_th1. These threshold values T_th1 and T_th2 may be calibration values, which may be determined during an experimental activity on a test bench and then stored in the memory system 460. For example, the first threshold value T_th1 may be of about 250° C. and the second threshold value T_th2 may be of about 450° C.

The value SLL of the soot loading level is compared (block 620) with a threshold value SLL_th thereof. This threshold value SLL_th may be determined on the basis of the current values ES and EL of engine speed and engine load respectively. The current value ES of engine speed may be determined with the aid of the crankshaft position sensor 420, whereas the current value EL of engine load may be determined by the ECU 450 on the basis of many other parameters including, but not limited to, the accelerator pedal position as sensed by the position sensor 445. The current values ES and EL are used as inputs of a calibration map 625, in order to retrieve from the latter a corresponding threshold value SLL_th of the soot loading level. The calibration map 625 may be empirically determined during an experimental activity on a test bench and then stored in the memory system 460.

The check block 600 yields that a passive regeneration is occurring if the following conditions are contemporaneously met (block 630): the current value NC of the nitrogen oxides content exceeds the threshold value NC_th, the current value T of the exhaust gas temperature is comprised between the threshold values T_th1 and T_th2 (block 635), and the current value SLL of the soot loading level exceeds the threshold value SLL_th. If one of these conditions is not satisfied, the check block 600 yields that a passive regeneration of the DPF 285 is not actually occurring.

As previously mentioned, as long as the check block 600 yields a negative result (no passive regeneration, see FIG. 4), the ECU 450 estimates (block 645) the variation SLL_var of the soot loading level in an almost conventional way.

By way of example, the ECU 450 may determine a variation of the pressure drop across the DPF 285, for example with the aid of the pressure sensors 430, and may determine the variation SLL_var of the soot loading level as a function of the determined pressure drop variation, for example with the aid of a mathematical model of the DPF 285 that receives as input the pressure drop variation and yields as output the corresponding variation SLL_var or the soot loading level.

However, it should be understood that the variation SLL_var of the soot loading level could be estimated with other conventional estimating methods, and not necessarily on the basis of the pressure drop across the DPF 285.

When a passive regeneration of the DPF 285 begins, namely when the check block 600 yields for the first time that a passive regeneration of the DPF 285 is occurring, the ECU 450 starts the subroutine globally indicated with 700.

This subroutine 700 firstly provides for memorizing an initial value SLL* of the soot loading level (block 705). The initial value SLL* is set equal to the current value SLL of the soot loading level, namely to the last (most updated) value SLL calculated by the routine of FIG. 3, at the time that the check block 600 actually yields a positive result. In this way, the initial value SLL* represents the soot loading level that was present in the DPF 285 when the passive regeneration of the DPF 285 began.

Afterwards, the subroutine 700 provides for determining a rough variation SLL_var* of the soot loading level (block 715).

The rough variation SLL_var* of the soot loading level may be determined with the same conventional estimating method involved in the estimating block 645. In other words, the result of the conventional estimating method, which would be considered as an effective estimation of the variation SLL_var in the block 645 (i.e. when no passive regeneration is occurring), may be here considered as a rough estimation that needs to be corrected.

By way of example, the ECU 450 may determine the variation of the pressure drop across the DPF 285, for example with the aid of the pressure sensors 430, and may determine the rough variation SLL_var* of the soot loading level as a function of the determined pressure drop variation, for example with the aid of the same mathematical model of the DPF 285 previously mentioned.

However, also in this case, it should be understood that the rough variation SLL_var* of the soot lading level could be determined with other conventional estimating methods, and not necessarily on the basis of the pressure drop across the DPF 285.

The subroutine 700 includes the subsequent steps of determining a correction C (block 725), and then of calculating the definitive variation SLL_var of the soot loading level as the sum of the rough variation SLL_var* and the determined correction C (block 730).

Figure 6:
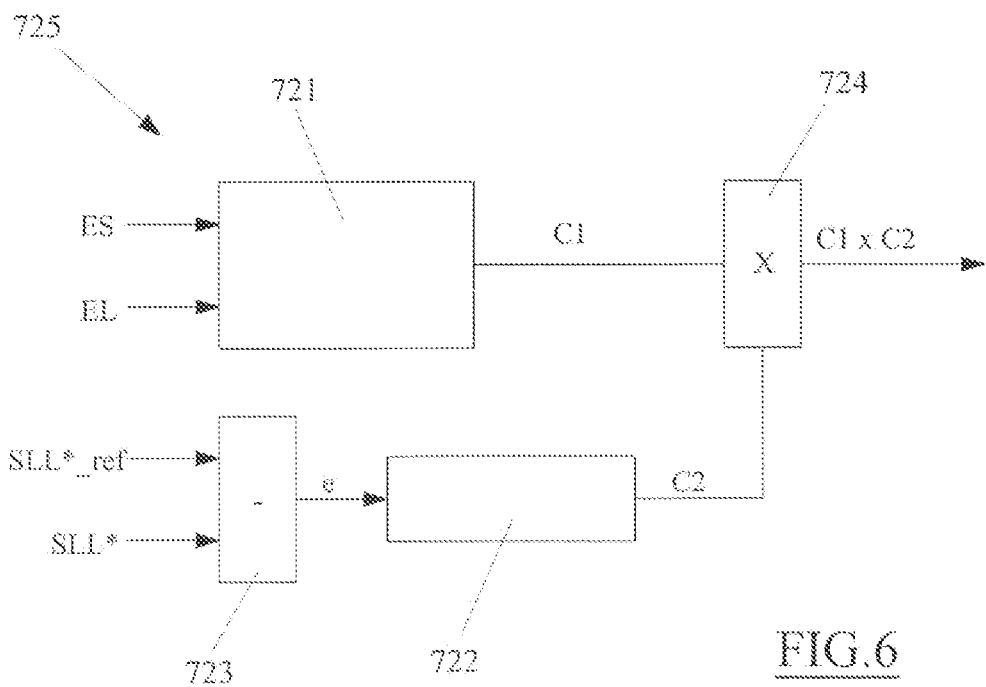
FIG. 6 is a flowchart representing a calculation procedure involved in the strategy of FIG. 4.

In general, the correction C may be determined as a function of a first and second correction factors C1 and C2, as explained in greater details with reference to FIG. 6 in accordance with an embodiment.

The first correction factor C1 may be determined on the basis of the current values ES and EL of engine speed and engine load. As already mentioned, the current value ES of engine speed may be determined with the aid of the crankshaft position sensor 420, whereas the current value EL of engine load may be determined by the ECU 450, on the basis of many other parameters including, but not limited to, the accelerator pedal position as sensed by the position sensor 445. The current values ES and EL are used as inputs of a calibration map 721, in order to retrieve from the latter a corresponding correction factor of the variation of the soot loading level. The calibration map 721 may be empirically determined during an experimental activity on a test bench and then stored in the memory system 460. The memory system 460 may include more than one calibration map 721, each of which determined for a different value of the environmental pressure. In this case, the strategy would include also the steps of measuring the environmental pressure and of selecting the calibration map 721 on the basis of the measured pressure.

The second correction factor C2 may be determined on the basis of the initial value SLL* of the soot loading level, which has been previously memorized and which represents the soot loading level that was present in the DPF 285 when the passive regeneration began. More particularly, the second correction factor C2 may be determined with the aid of another calibration map 722, which can be memorized in the memory system 460. This additional calibration map 722 may be determined during an experimental activity carried out on a test bench for a given reference value SLL* ref of the initial soot loading level, in order to correlate any deviation of the initial value SLL* soot loading level (from the reference value SLL*_ref) to a corresponding correction C2. As a consequence, the correction C2 may be determined by calculating (block 723) the difference e between the memorized initial value SLL* and the above mentioned reference value SLL*_ref, and by using that difference e as input of the calibration map 722, in order to retrieve form the latter the corresponding correction C2 of the variation of the soot loading level.

The second correction factor C2 is then multiplied by the first correction factor C1 (block 724), in order to calculate the definitive correction C of the variation of the soot loading level.

Turning now to FIG. 4, once the final variation SLL_var is calculated, the subroutine 700 provides for checking (check block 800) whether the passive regeneration of the DPF 285 is still occurring or not.

Figure 7:
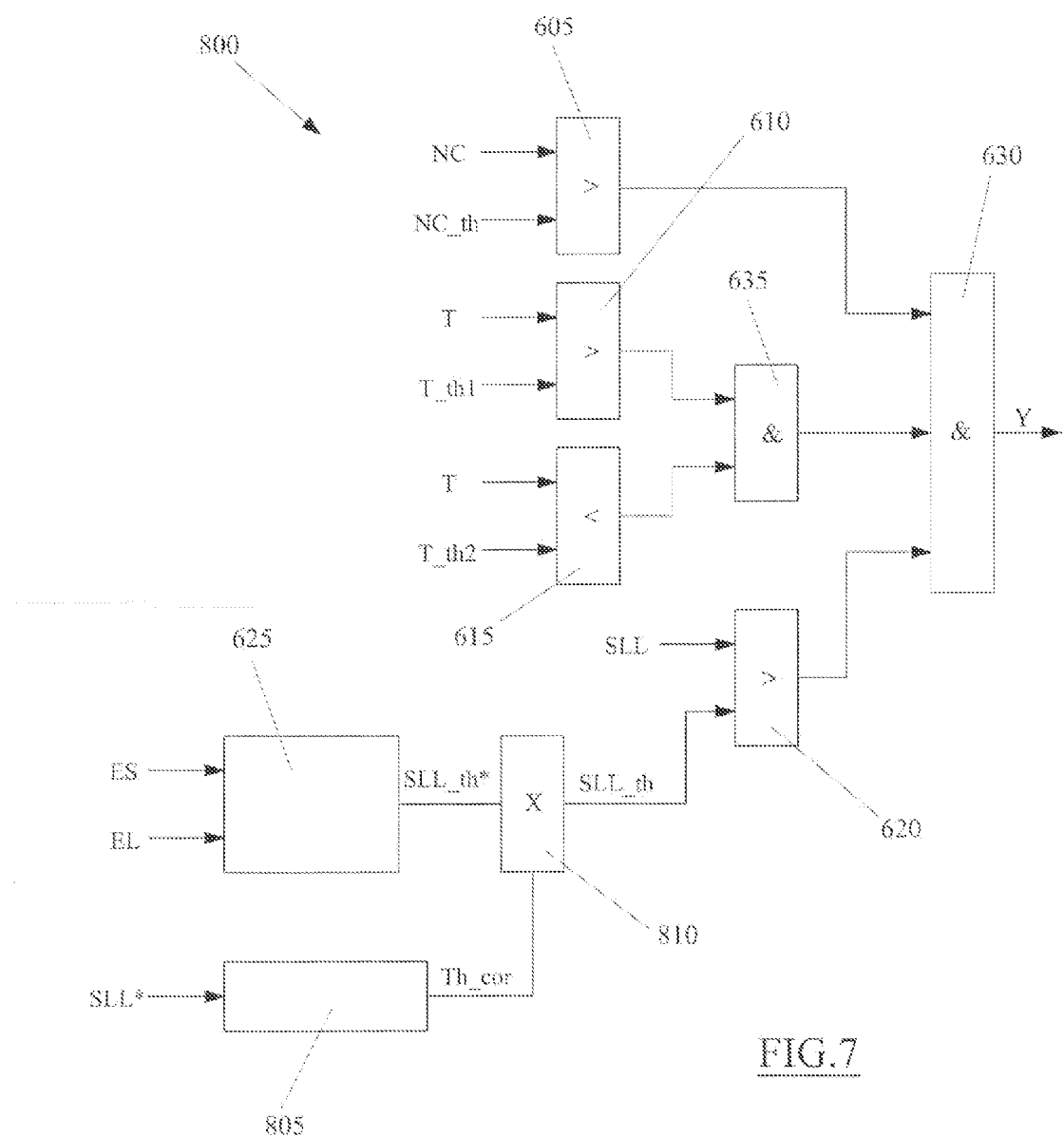
FIG. 7 is a flowchart of another check procedure involved in the strategy of FIG. 4.

At this stage, the check block 800 may be performed according to the strategy illustrated in FIG. 7 in accordance with an embodiment. This strategy is basically the same that is implemented in the first check block 600. As a matter of fact, the only difference lies in the determination of the threshold value SLL_th of the soot loading level, which is made not only on the basis of the current values ES and EL of engine speed and engine load, but also on the basis of the initial value SLL* of the soot loading level, which has been previously memorized and which represents the soot loading level that was present in the DPF 285 when the passive regeneration began. More particularly, the procedure provides for determining the current values ES and EL of engine speed and engine load. The current values ES and EL are used as inputs of the calibration map 625, in order to retrieve from the latter the corresponding threshold value of the soot loading level which, in this specific case, is considered as a rough threshold value SLL_th*. In other words, the output of the calibration map 625, which would be considered as a definitive threshold value for the check block 600 (see FIG. 5), is here considered as a rough threshold value that needs to be corrected on the basis of the initial value SLL* of the soot loading level.

By way of example, the initial value SLL* of the soot loading level may be used as input of a calibration map 805, which yields as output a corresponding threshold-value correction Th_cor. The calibration map 805 may be determined during an experimental activity on a test bench and then stored in the memory module. The threshold-value correction Th_cor is then multiplied (block 810) by the rough threshold value SLL_th*, in order to calculate the final threshold value SLL_th in the check block 800.

As a matter of fact, the check block 800 provides also for determining the current value NC of the nitrogen oxides content of the exhaust gasses at the inlet of the DPF 285, the current value T of the temperature of the exhaust gasses at the inlet of the DPF 285, as well as the current value SLL of the soot loading level within the DPF 285.

The check block 800 yields that the passive regeneration is still occurring if the following conditions are contemporaneously met (block 630): the current value NC of the nitrogen oxides content exceeds the threshold value NC_th, the current value T of the exhaust gas temperature is comprised between the threshold values T_th1 and T_th2 (block 635), and the current value SLL of the soot loading level exceeds the threshold value SLL_th depending on the current values ES and EL of engine speed and engine load. If one of these conditions is not satisfied, the check block 800 yields that the passive regeneration of the DPF 285 is occurring no more.

As long as the check block 800 yields a positive result (passive regeneration still occurring), the subroutine 700 provides for repeating the preceding steps, starting from the determination of a new rough variation SLL_var* of the soot loading level, and so on.

When the check block 800 yields that the passive regeneration is over, the subsequent variation SLL_var of the soot loading level is determined in the conventional way, starting from the block 645 and then returning at the beginning.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of estimating a variation of a quantity of soot accumulated in a diesel particulate filter for initiating active regeneration of the diesel particulate filter coupled to an internal combustion engine having an engine control unit, wherein the method comprises:
   a passive-regeneration check for checking whether a passive regeneration of the diesel particulate filter is occurring and, when the passive-regeneration check yields that a passive regeneration is actually occurring, the method further comprises the steps of:
   storing an initial quantity of soot accumulated in the diesel particulate filter when the passive regeneration began in a memory system;
   determining a rough variation of the quantity of soot accumulated in the diesel particulate filter;
   determining an engine speed and an engine load of the internal combustion engine;
   determining a correction factor to account for passive regeneration using the engine speed, the engine load and the initial quantity of soot, and
   calculating with the engine control unit, a variation of the quantity of soot accumulated in the diesel particulate filter as a function of the rough variation and the correction factor;
   wherein the variation of the quantity of soot accumulated in the diesel particulate filter is used to compute a current quantity of accumulated soot in the diesel particulate filter for triggering an active regeneration thereof when the current quantity of accumulated soot exceeds a predetermined threshold value.

2. A method according to claim 1, wherein determining the correction factor comprises:
   determining a first correction factor using the engine speed and the engine load;
   determining a second correction factor using the initial quantity of soot; and
   calculating the correction factor as a function of the first and the second correction factor.

3. A method according to claim 2, further comprising determining the first correction factor by retrieving, from a first calibration map stored in the memory system, the first correction factor corresponding to the engine speed and the engine load.

4. A method according to claim 3, further comprising determining the second correction factor by retrieving, from a second calibration map stored in the memory system, the second correction factor corresponding to the initial quantity of soot.

5. A method according to claim 4, wherein determining the second correction factor is performed by:
   calculating a difference between the initial quantity of soot and a predetermined reference value, and
   retrieving, from the second calibration map the second correction factor corresponding to this difference.

6. A method according to claim 1, wherein the passive-regeneration check comprises the steps of:
   determining a content of nitrogen oxides in the exhaust gasses at the inlet of the diesel particulate filter;
   determining a temperature of the exhaust gasses at the inlet of the diesel particulate filter;
   determining a current soot loading level in the diesel particulate filter; and
   wherein the regeneration status indicates passive regeneration when following conditions are met:
   the content of nitrogen oxides in the exhaust gasses exceeds a predetermined NOX threshold value;
   the temperature of the exhaust gasses is within a predetermined temperature range; and
   the current soot loading level exceeds a predetermined threshold value.

7. A method according to claim 6, wherein the predetermined threshold value is determined using parameters comprising the engine speed and the engine load.

8. A method according to claim 7, wherein the predetermined threshold value is determined using parameters further comprising the initial quantity of soot.

9. A method according to claim 8, wherein the predetermined threshold value is determined by:
   determining a rough threshold value using the engine speed and the engine load;
   determining a threshold-value correction using the initial quantity of soot; and
   multiplying the rough threshold value by the threshold-value correction.

10. A method according to claim 9, further comprising determining the rough threshold value by retrieving, from a third calibration map stored in the memory, the rough threshold value corresponding to the engine speed and the engine load.

11. A method according to claim 10, further comprising determining the threshold-value correction, by retrieving, from a fourth calibration map stored in the memory, the rough threshold value corresponding to the initial quantity of soot.

12. A non-transitory computer readable medium embodying a computer program product, the computer program product comprising:
   a computer program, the computer program configured to estimate a variation of a quantity of soot accumulated in a diesel particulate filter for initiating active regeneration of the diesel particulate filter coupled to an internal combustion engine, wherein the computer program comprises a passive-regeneration check for checking whether a passive regeneration of the diesel particulate filter is occurring and, if the passive-regeneration check yields that a passive regeneration is actually occurring, the computer program is configured to:
   store an initial quantity of soot accumulated in the diesel particulate filter when the passive regeneration began in a memory system;
   determine a rough variation of the quantity of soot accumulated in the diesel particulate filter;

determine an engine speed and an engine load of the internal combustion engine;

determine a correction factor to account for passive regeneration using the engine speed, the engine load and the initial quantity of soot, and calculate a variation of the quantity of soot accumulated in the diesel particulate filter as a function of the rough variation and the correction factor wherein the variation of the quantity of soot accumulated in the diesel particulate filter is used to compute a current quantity of accumulated soot in the diesel particulate filter for triggering an active regeneration thereof when the current quantity of accumulated soot exceeds a predetermined threshold value.

13. The non-transitory computer readable medium according to claim 12, wherein to determine the correction factor the computer program is configured to:

determine a first correction factor using the engine speed and the engine load;

determine a second correction factor using the initial quantity of soot; and calculate the correction factor as a function of the first and the second correction factor.

14. The non-transitory computer readable medium according to claim 13, wherein the computer program is configured to determine the first correction factor by retrieving, from a first calibration map from the memory system, the first correction factor corresponding to the engine speed and the engine load.

15. The non-transitory computer readable medium according to claim 14, wherein the computer program is configured to determine the second correction factor by retrieving, from a second calibration map stored in the memory system, the second correction factor corresponding to the initial quantity of soot.

16. The non-transitory computer readable medium according to claim 15, wherein the computer program is configured to determine the second correction factor by:

calculating a difference between the initial quantity of soot and a predetermined reference value, and retrieving, from the second calibration map, the second correction factor corresponding to this difference.

17. The non-transitory computer readable medium according to claim 12, wherein the computer program is configured to check a regeneration status by:

determining a content of nitrogen oxides in the exhaust gasses at the inlet of the diesel particulate filter;

determining a temperature of the exhaust gasses at the inlet of the diesel particulate filter;

determining a current soot loading level in the diesel particulate filter; and wherein the regenerations status indicates passive regeneration when the following conditions are met:

the content of nitrogen oxides in the exhaust gasses exceeds a predetermined NOX threshold value;

the temperature of the exhaust gasses is within a predetermined temperature range; and the current soot loading level exceeds a predetermined threshold value.

18. The non-transitory computer readable medium according to claim 17, wherein the computer program is configured to determine the predetermined threshold value using parameters comprising the engine speed and the engine load.

19. The non-transitory computer readable medium according to claim 18, wherein the computer program is configured to determine the predetermined regeneration value using parameters further comprising the initial quantity of soot.

20. The non-transitory computer readable medium according to claim 12, wherein the computer program is configured to determine the predetermined threshold value by:

determining a rough threshold value using the engine speed and the engine load;

determining a threshold-value correction using the initial quantity of soot; and multiplying the rough threshold value by the threshold-value correction.

21. The non-transitory computer readable medium according to claim 20, wherein the computer program is configured to determine the rough threshold value by retrieving, from a third calibration map stored in the memory, the rough threshold value corresponding to the engine speed and the engine load.

22. The non-transitory computer readable medium according to claim 21, wherein the computer program is configured to determine the threshold-value correction, by retrieving, from a fourth calibration map stored in the memory, the rough threshold value corresponding to the initial quantity of soot.

* * * * *